United States Patent [19]

Love, III

[11] 4,368,669

[45] Jan. 18, 1983

[54] METHOD AND APPARATUS FOR NON-IMPACT PRINTING ON BARRIER COATED SUBSTRATE

[75] Inventor: Franklin S. Love, III, Spartanburg, S.C.

[73] Assignee: Milliken Research Corporation, Spartanburg, S.C.

[21] Appl. No.: 221,982

[22] Filed: Jan. 2, 1981

[51] Int. Cl.$^3$ .......... G01D 5/44; B05B 5/02

[52] U.S. Cl. .......... 101/426; 101/1; 101/DIG. 13; 118/623; 118/625; 118/642; 118/671; 346/140 R; 346/155; 427/13; 427/14.1; 430/118; 355/10

[58] Field of Search .......... 101/426, DIG. 13, 1 R; 346/153, 155, 156, 165, 140; 118/623, 669-671, 625, 641-643; 427/12-13, 14.1, 26, 32, 145, 402; 430/62, 64, 67, 112, 117, 124, 118, 126; 355/10

[56] References Cited

U.S. PATENT DOCUMENTS

| | | | |
|---|---|---|---|
| 2,117,200 | 5/1938 | Miller | 118/643 X |
| 2,143,376 | 1/1939 | Hansell | 101/DIG. 13 |
| 3,052,213 | 9/1962 | Schaffert | 101/DIG. 13 |
| 3,084,043 | 4/1963 | Gundlach | 355/10 |
| 3,121,375 | 2/1964 | Fotland et al. | 101/DIG. 13 |
| 3,152,858 | 10/1964 | Wadey | 346/75 |
| 3,247,825 | 4/1966 | Johnson | 118/652 |
| 3,328,193 | 6/1967 | Oliphant et al. | 101/DIG. 13 |
| 3,367,791 | 2/1968 | Lein | 101/DIG. 13 |
| 3,392,705 | 7/1968 | McBride | 118/630 |
| 3,425,829 | 2/1969 | Cassiers et al. | 101/DIG. 13 |
| 3,462,286 | 8/1969 | Geest et al. | 101/DIG. 13 |
| 3,472,676 | 10/1969 | Cassiers et al. | 101/DIG. 13 |
| 3,486,922 | 12/1969 | Cassiers et al. | 101/DIG. 13 |
| 3,512,177 | 5/1970 | Mutschler et al. | 346/140 |
| 3,512,965 | 5/1970 | Matkan | 101/DIG. 13 |
| 3,560,204 | 2/1971 | Damm, Jr. | 101/DIG. 13 |
| 3,565,039 | 2/1971 | Remer | 118/643 |
| 3,605,692 | 9/1971 | Maloney et al. | 118/637 |
| 3,664,298 | 5/1972 | Giamo, Jr. | 118/637 |
| 3,701,337 | 10/1972 | Borelli et al. | 118/637 |
| 3,739,087 | 6/1973 | Metcalfe | 346/74 ES |
| 3,752,288 | 8/1973 | Detig et al. | 101/DIG. 13 |
| 3,786,515 | 1/1974 | Walker | 101/DIG. 13 |
| 3,806,355 | 4/1974 | Kaufman | 101/DIG. 13 |
| 3,818,492 | 6/1974 | Matkan | 101/DIG. 13 |
| 3,834,301 | 9/1974 | Croquelois et al. | 101/DIG. 13 |
| 3,867,674 | 2/1975 | Simm | 101/426 X |
| 3,872,480 | 3/1975 | Engelbrecht | 101/DIG. 13 |
| 3,885,960 | 5/1975 | Anderson | 430/118 |
| 3,901,188 | 8/1975 | Eberlein | 355/10 |
| 4,161,141 | 7/1979 | Lakhani | 101/1 |
| 4,205,320 | 5/1980 | Fujii | 346/1.1 |
| 4,246,839 | 1/1981 | Willbanks | 101/1 |
| 4,251,827 | 2/1981 | Fujii | 346/153.1 |

FOREIGN PATENT DOCUMENTS

| | | | |
|---|---|---|---|
| 2009567 | 2/1970 | France | 101/DIG. 13 |
| 1483935 | 8/1977 | United Kingdom | 101/DIG. 13 |

OTHER PUBLICATIONS

"Contrography, A New Electronic Imaging Technology", Photographic Science & Engineering, vol. 15, No. 5, Sep.-Oct. 1971, pp. 431-436.

*Primary Examiner*—E. H. Eickholt
*Attorney, Agent, or Firm*—George M. Fisher; H. William Petry

[57] ABSTRACT

An improved method and apparatus for non-impact printing on a substrate is disclosed. The substrate is dried and one surface thereof is coated with a barrier material, after which a marking material immiscible with the barrier material is applied to that surface. An electric field generator which may be in the form of an array of electrical styli is positioned adjacent a second surface of the substrate, opposite the point of application of the marking material. Vacuum means may be used to promote contact between the substrate and the styli. Voltage selectively applied to the styli allows the marking material to displace the barrier material and wet the previously coated substrate surface, thereby forming a printed image.

9 Claims, 8 Drawing Figures

METHOD AND APPARATUS FOR NON-IMPACT PRINTING ON BARRIER COATED SUBSTRATE

This invention relates generally to a method and apparatus for relatively high speed, non-impact printing of data or imagery generated by electronic means, in which high resolution images in a matrix format may be produced on a variety of substrates, including ordinary paper, using non-specialized aqueous inks.

BACKGROUND OF THE INVENTION

Matrix printing systems are systems in which all the necessary characters or images are printed as groupings of small, closely spaced dots or line segments which, when seen from a normal viewing distance, blend to form the desired visual effect. Considerable research effort has been directed to the development of a reliable, relatively inexpensive, high speed non-impact electrostatic matrix printing system for converting data or imagery in the form of electrical signals into permanent form with high accuracy and resolution, and without the need for special paper or other substrate material, or exotic toners and image developers. The present invention is a step forward in this development effort, and is an advance over the invention disclosed in commonly assigned U.S. Pat. Application Ser. No. 053,853, filed July 2, 1979 now U.S. Pat. No. 4,246,839.

In the past, non-impact printing of data has been accomplished in several ways. For example, in one matrix system, an electrostatic image is imprinted on the surface of a highly insulating substrate through the use of an array of high voltage electrodes in close proximity to the substrate surface. The image is then developed by allowing toner particles charged in opposite polarity to coat the electrostatically imaged surface, and fixing those particles attracted to the image through thermal, chemical or other means. In a variation of this system, an array of electrodes is placed opposite an ink or particle source, with a substrate lying therebetween. An electrical potential selectively placed on electrodes in the array produces a field which penetrates the substrate and causes non-aqueous ink or toner particles to be attracted from the source to the surface of the substrate opposite the electrode. Variations of these systems include using corona discharges to produce ink-attracting images on paper or other substrates, using highly insulating or photoconductive or other specially constructed belts to act as image transfer means, and varying the positions of imaging means and ink or particle sources relative to the substrate. It is also known in the art to use a barrier coating or film on the substrate or paper as a means of either blocking developer from access to areas on the substrate which have already been charged or as a means of preserving the existing charge in an imaged area and thereby attracting the ink or developing material.

In spite of intensive efforts in this art, major shortcomings in known non-impact printing processes have remained, especially in connection with electrographic processes, i.e., processes which must transform real time electrical impulses into imagery, as opposed to photographic or facsimile processes which merely duplicate text or images from a copy master, such as are used in office photocopying machines. One such major shortcoming involves the phenomenon known as "background", i.e., the presence of undesired dots, lines, or shaded background areas in printed copies. Attempts to overcome this problem have often involved the use of relatively expensive pre-treatment of the paper or other substrate used as the print medium. Another common problem has been maintaining uniformly satisfactory print quality. Specialized, expensive inks or dyes have been found necessary in some systems to produce a satisfactory image or to maintain proper print quality, particularly where the printed image has required the even application of ink over a relatively large area. Yet another problem has been the relative lack of speed commonly available in present plain paper electrographic systems.

The printing system described in commonly assigned U.S. Pat. No. 4,246,839 made a significant contribution towards solving these problems in an effective and economical way. It was found, however, that under certain conditions, some difficulty was experienced with that system in connection with maintaining overall print quality and completely eliminating unwanted background. It has been discovered that, when using plain non-dielectric paper as a substrate, print quality is affected by the amount of atmospheric moisture which has been absorbed by the paper. This finding is contrary to the teachings in the available literature, wherein substrate moisture is regarded as either unimportant or as a positive benefit. For example, in many cases where electrographic paper is used, the moisture serves to enhance the coupling of the electrostatic field from the electrode through the paper.

Applicant discovered that the rapid passage of paper over the insulating matrix used to support the individual styli in the stylus bar tends to induce the generation and accumulation of a triboelectric charge on the stylus bar and paper, particularly when the stylus tips are not raised above the surface of the matrix. This triboelectric charge build-up in the immediate vicinity of the styli causes severe background and degradation in print quality. In addition, flush or recessed mounting of the stylus tips does not allow the paper to achieve contact with the stylus tips, often resulting in sporadic print quality. It has been found that when the tips of the styli are raised slightly above the insulating matrix to reduce the aforementioned effects, the paper tends to wrinkle as it is drawn over the stylus tips and thereby loses the uniformly close contact with the stylus tips which is associated with consistently high print quality. The apparatus and method of the invention described herein represents a substantial advancement in the art of non-impact electrographic printing, in that it effectively overcomes the problems discussed above.

SUMMARY OF INVENTION

In one form thereof, the method and apparatus of this invention provides a means for the non-impact, electrostatic, matrix printing of computer-generated graphical or alphanumeric data or imagery on a flexible substrate using ordinary aqueous inks. In a preferred embodiment, ordinary non-dielectric paper is first dried to remove excess moisture, then cleaned but not otherwise treated. The paper is then lighty coated on one surface with a barrier material which is relatively electrically non-conductive and relatively immiscible with respect to the ink or dye used. An application roller having access to a supply of ink or dye is located in close proximity to the coated surface of the paper, and an ink or dye meniscus is formed across the width of the paper between the application roller and the coating of barrier material previously applied to the paper surface.

On the side of the paper opposite the application roller, a preferred electric field generated means such as a stylus bar, comprising a support means and an insulating matrix containing a single row of electrically conductive styli, is positioned adjacent to the uncoated surface of the paper, parallel to and opposite the meniscus. The tip of each stylus protrudes slightly from the surface of the insulating matrix. This matrix insulates each stylus from other styli as well as from the stylus support means. Flanking the stylus bar are vacuum means which act to draw the uncoated surface of the paper toward the stylus bar and into operative relationship with the exposed stylus tips, as the paper moves relative to the stylus bar. Alternatively, the angle subtended by the stylus bar with respect to the paper may be reduced, to direct the uncoated surface of the paper against the stylus tips.

In the absence of an energy field, the barrier material prevents the ink or dye in the meniscus from wetting the coated paper surface, and the ink or dye is maintained either in the meniscus or on the surface of the applicator roll. When individual styli are selectively energized with a voltage of several hundred volts, the ink or dye in the meniscus selectively displaces the barrier material on the coated surface of the paper, thereby wetting the paper surface directly opposite the tip of the energized stylus and forming a printed mark on the paper surface carrying the barrier material. The paper surface carrying the barrier material/ink composite may then be dried, thereby forming a permanent image.

The non-impact printer of this invention is capable of high speed, high resolution printing of graphical or alpha-numeric material on plain (i.e., non-dielectric) paper with virtually no background and with a uniformly high level of print quality. It may be easily interfaced with a variety of electronic computer hardware configurations for use in telecommunications, general computer output use, or other "hard copy" applications. In one embodiment, the printer of this invention may be used to print paper transfer sheets for use on textiles.

The system of the present invention offers a distinct advantage where high quality, high resolution printing is required. Many print systems, for example, conventional rotogravure systems, are constrained to use a half tone technique to represent gradations in shading, in which the size and spacing of small ink dots are used to create the necessary tonal shadings. However, in such matrix systems, the quantity of ink per unit area within each dot generally is not subject to control. The present invention is a matrix printing system in which the actual quantity of ink per unit area within each dot of any given size may be varied, in addition to varying the overall size and spacing of the dot as in conventional matrix-type systems, thus giving the printer extraordinary versatility and control.

BRIEF DESCRIPTION OF THE DRAWINGS

Details of the invention will be described with reference to the following drawings, which show only the parts necessary for an understanding of the invention, and in which.

Like features bear like reference numbers throughout.

DETAILED DESCRIPTION

Figure 1:
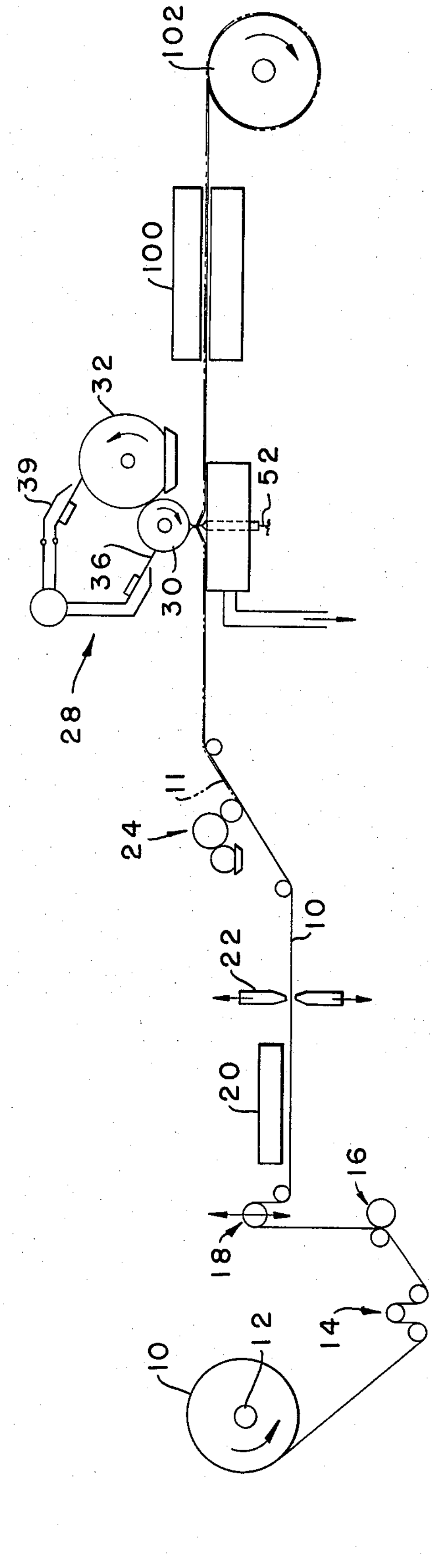
FIG. 1 is a schematic illustration of the overall printer.

FIG. 1 is intended to depict schematically the overall system in accordance with one preferred embodiment; several alternative embodiments which may prove satisfactory or even preferable under certain conditions are discussed below. Many forms of inks, dyes, or other marking material may be used. For purposes of discussion, hereinafter the term "ink" will be taken to mean any suitable marking material. While the Figures referenced herein depict an apparatus in which the substrate is essentially horizontally oriented, and the barrier material and ink are applied to the upper surface, the invention can be practiced with the substrate at any vertical orientation, and with the barrier material and ink both applied to either the upper or lower surface. Furthermore, even though rotogravuretype paper has been found to be particularly suitable as a substrate and the following description therefore speaks in terms of paper, a wide variety of substrates e.g., plastic films or relatively non-porous fabrics, may be used in connection with the instant invention.

Tracing the passage of a section of substrate, for example, rotogravure paper, to be imprinted on the apparatus depicted in FIG. 1, paper substrate 10 stored on roll 12 passes over a set of let-off rolls 14, then through printer rolls 16, where a small mark is printed at precise, regular intervals along the edge of the paper as it passes through rolls 16. These marks can be useful in maintaning proper pattern registration. Following the printing of these registration marks, the paper passes through tension measuring rolls 18.

It has been found that when a rotogravure-type paper is used as the substrate, the moisture content of the bulk paper which has been allowed to stand in ordinary, indoor environments prior to application of the barrier material is frequently too high for best results. Excessive moisture tends to result in the generation of undesirable background, and further results in a blurred or fuzzy-appearing printed image. For this reason, a pre-drying means, shown at 20 in FIG. 1, is installed in the paper path prior to the barrier material applicator and used to reduce the moisture of the paper before the application of the barrier material. One pre-drying means found effective is an infra-red heater unit manufactured by the Fostoria Corp. of Ohio. Care must be taken that ambient moisture is not allowed to be reacquired by the paper before application of the barrier material and the ink. Depending upon conditions, this process can be extremely fast, i.e., a matter of several seconds. Care also must be taken not to reduce the moisture content of the paper to an unacceptably low value. Insufficient moisture in the paper will result in the generation and accumulation of a substantial triboelectric charge as the paper passes over the stylus bar and the various guide means.

The exact levels of moisture found to produce best results are extremely difficult to measure with accuracy, because of the exceedingly small quantities of moisture to be found in substrate laboratory samples of practical size, and because of the speed with which such samples acquire ambient atmospheric moisture after being dried by the apparatus of this invention. For this reason, accurate quantative moisture levels cannot be specified; however, it is believed that, by following the particulars given herein, one skilled in the art will have no difficulty in arriving at a totally satisfactory level of substrate moisture. Hereinafter, reference to any substrate (including paper) or dry substrate will refer to a substrate having a moisture content which results in acceptable background, sharp printed images, and which minimizes the generation of triboelectric charges.

As a further conditioning step, it is desirable to clean the surface of the paper or other substrate in order to remove dust or other foreign matter which could adversely affect the quality of the printed image. This may be done through the use of vacuum means schematically depicted at 22, or by other means.

After the paper has been prepared as outlined above, a barrier material is applied as a film or coating to one surface of the paper—in the embodiment shown in FIG. 1, the upper surface has been chosen. In one embodiment of the invention, the barrier material is applied as a liquid, but it is forseen that barrier materials which are non-liquid when applied, such as low-melting solids, e.g., higher molecular weight paraffins or other waxes, could be employed as well. Where the barrier material is in liquid form, the method of application may be through the use of a set of applicator rolls 24, as shown, or may be through the use of spraying means, or any other method resulting in the desired distribution of barrier material on the chosen substrate. For most purposes, a relatively even coating of the barrier material is recommended.

The barrier material comprising the film should be relatively immiscible with respect to the ink to be used. The barrier material must have the property that, in the absence of an electric field, ink applied to the barrier material-treated surface of the paper will not wet the paper surface. The barrier material should be relatively non-conducting with respect to the ink or dye used, and preferably should be relatively low in viscosity. Furthermore, subsequent drying of the inked paper surface can be aided if the barrier material is somewhat volatile. Examples of liquid barrier materials which have been found to be satisfactory from the standpoint of price and availability include the liquid paraffins n-pentane, n-hexane, Isopar E, G, H, and K (trademarks of Exxon), and Amsco mineral spirits 66/3 manufactured by Union Oil Co.

Figure 2:
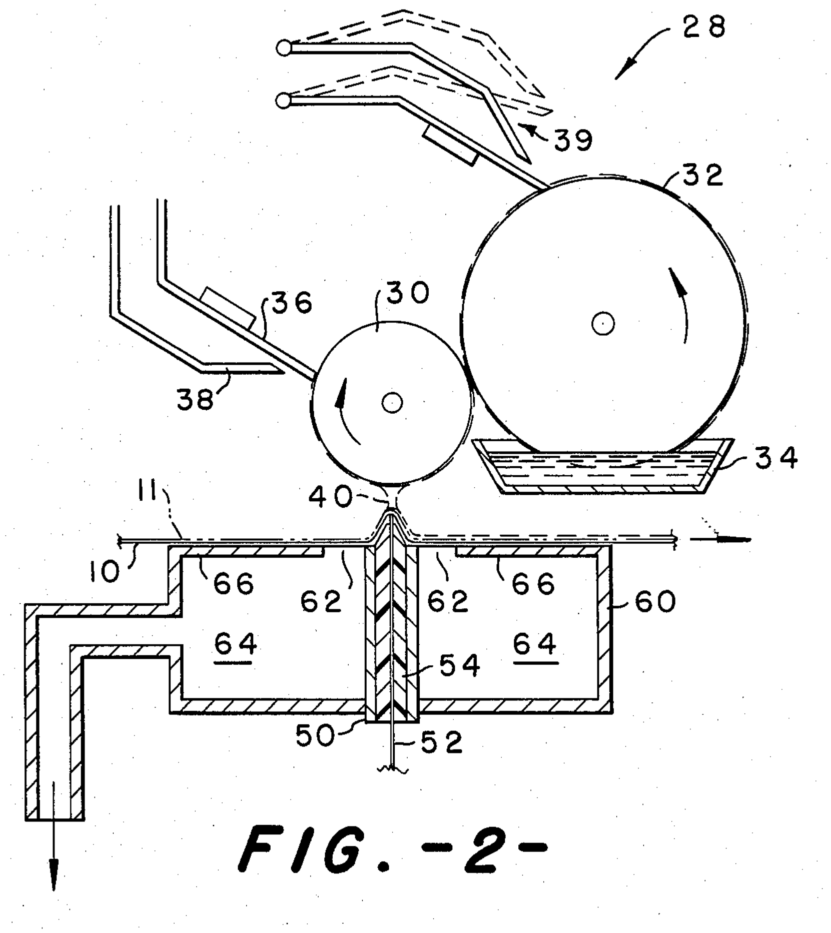
FIG. 2 is a schematic section view of a printing station.

The next step shown in FIG. 1 includes the actual imaging of the paper surface at a print station shown generally at 28 and depicted in greater detail in FIG. 2. Paper 10, carrying a thin film 11 of barrier material on its upper surface, is passed under applicator roll 30 which carries on its surface a thin layer of ink supplied by pick-up roll 32 rotating through ink trough 34. Vacuum-assisted doctoring means 39 is adjustably mounted and may be positioned as shown to clean the surface of roll 32 as required. Ink is made available for contacting the paper surface via the formation of a meniscus 40 which is formed across the width of the paper between the layer of ink on the surface of applicator roll 30 and the film 11 of barrier material on the surface of paper 10. It is advantageous that roll 30 be designed to discourage barrier material from adhering to the ink layer on the surface of roll 30, or displacing the ink layer from the roll surface. In other words, it is advantageous that the surface of roll 30 be wetted by the ink, and not be wetted by the barrier material comprising the film 11 on the paper surface. Furthermore, even feeding of the ink-containing meniscus 40 as well as efficient doctoring of excess ink from roll 30 is promoted if the surface of roll 30 is smooth. It has been found that a roller surface having a uniform, thin coating of glass or ceramic material works well in this application.

Normally, the ink used in the present invention will comprise a liquid and a coloring agent, and will be relatively immiscible with the chosen barrier material. Liquids which have been used include water and mixtures of water with isopropanol, ethylene glycol, and glycol ethers such as ethylene glycol monomethyl ether. It is not required that the ink be a good conductor of electricity, so long as its relative conductivity is substantially higher than that of the barrier material. It is considered an important advantage of this invention that, unlike some systems which require highly specialized colorants or exotic toners, ordinary aqueous inks, for example of the type normally used in the textile industry in conjunction with the printing of transfer paper, produce excellent results with the method and apparatus herein described. In fact, any dyestuff, pigment, or other coloring matter which can be dissolved or otherwise dispersed in a liquid which is relatively conductive and relatively immiscible with respect to the chosen barrier material may be used as a coloring material. While most dyestuff and ink preparations include a surfactant, it is often advantageous to include an additional surfactant in the ink. Suitable surfactants include anionic surfactants such as sodium lauryl sulfate, sodium dodecyl benzene sulfonate, and nonionic surfactants such as the ethylene oxide-propylene oxide adducts of decyl alcohol.

The quantity of ink allowed to coat the surface of applicator roll 30, and therefore the quantity of ink available for maintaining meniscus 40, is controlled by adjustment of the level of ink in trough 34, adjustment of the spacing between rolls 30 and 32, and adjustment of the speed of rotation of the rolls 30 and 32. Prior to a fresh application of ink from pick-up roll 32, doctor blade 36 and vacuum means 38 are useful in cleaning from applicator roll 30 the admixture of ink and barrier material picked up from the paper surface via meniscus 40. In one form, vacuum means 38 associated with doctor blade 36 comprises an elongate, narrow slot or nozzle which extends across the width of roll 30. Ductwork serves to connect the vacuum mozzle with a source of partial vacuum, not shown. Vacuum means 38 assists in removing liquid material from the surface of applicator roll 30 and in carrying off removed material for disposal or separation and recycling. The size and exact location of meniscus 40 is dependent upon a variety of operating parameters, such as the quantity and viscosity of the ink, the quantity and viscosity of the liquid barrier material, the spacing between roll 30 and the barrier film 11 on paper 10, and the relative speed of paper 10 past rotating applicator roll 30.

Figure 3:
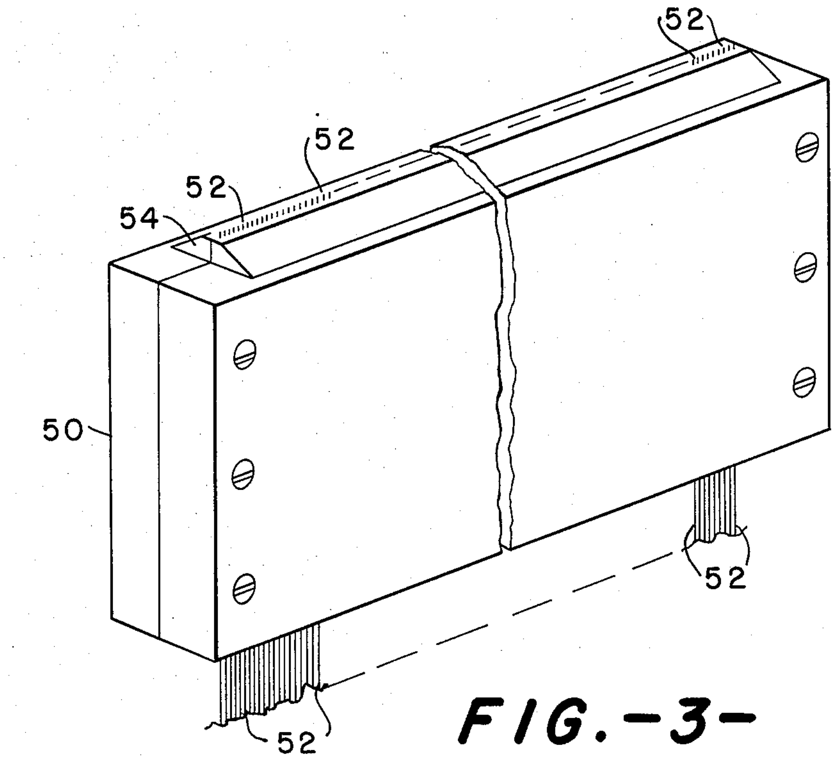
FIG. 3 is a perspective view of a stylus bar such as may be used in this invention.

An electric field generating means such as stylus bar 50 is situated opposite applicator roll 30, and forms a small gap therewith through which paper 10 must pass. As depicted in FIG. 3, stylus bar 50 is preferably comprised of a plurality of electrically conductive styli 52, arranged in an end-on orientation in a single row and embedded in a matrix of insulating material 54. In one embodiment, these individual styli 52 are comprised of stainless steel wires approximately 0.10 to 0.15 millimeter in diameter, and are arranged in a single row perpendicular to the direction of substrate travel, with the spacing between adjacent stylus tips chosen to permit printing with the desired resolution. A spacing of about 4 styli per linear millimeter may be used. The styli 52 are situated parallel to and opposite meniscus 40.

While this description speaks generally of using a stylus bar, alternative means to generate an electric field may be found equally suitable or even preferable for use with this invention, depending upon printing requirements and operating circumstances. For example, an etched electrode array may be used, in which a printed circuit board or similar substrate comprising an electrically conducting/insulating composite is etched to form an array of electrically conducting regions which are arranged in operative relationship with the substrate to be printed. The relative size and configuration of these conducting regions are determined by the level of print resolution desired. In one such embodiment, the conducting regions take the form of a plurality of small pads or buttons which are aligned along the apex of a printed circuit board which has been folded or creased, thereby permitting the small pads or buttons to be placed in operative relationship with the uncoated side of the substrate without intrusion of the board into the path of substrate travel.

To avoid the generation of triboelectric charges on the paper and the consequent degradation in print quality, the tips of styli 52 are exposed, or made to protrude slightly, for example, about 0.05 to 0.4 millimeter and preferably within the range of from about 0.1 to about 0.3 millimeter, above the surface of insulating matrix 54, as schematically depicted in FIG. 3. To establish a uniform geometry between the electric field generating means, in this case the protruding styli tips, and the uncoated side of the paper, it has been found advantageous to apply a force directed generally to drawing and holding the moving paper against the styli 52 and particularly to contouring the paper about the tips of sltyli 52. In conventional non-impact matrix printers, this is done, for example, with a U-shaped back bar which directly presses the paper onto the styli. In the present system, this cannot be done directly; to do so would disturb the barrier material/ink composite on the freshly printed side of paper 10. However, the effects of this force may be achieved indirectly in other ways, several of which are depicted in FIGS. 2, 4, 5, 6, and 7. In the embodiment shown in FIG. 2, the stylus bar 50 has been incorporated within a vacuum manifold 60. Elongate apertures or slots 62 are shown which extend parallel to stylus bar 50 and across the width of the paper 10 being printed. A partial vacuum within manifold cavity 64, generated by conventional means not shown, engages paper 10 and causes it to be drawn in the direction of vacuum slots 62. This has the combined effect of increasing the tension of the paper stretched across the top of stylus bar 50, of tending to contour or conform the paper about the tips of styli 52, and of increasing the effective pressure with which the styli 52 contact the paper surface, without the need for directly contacting the coated surface of the paper. In addition, use of such slots tends to prevent wrinkling of the paper as it passes in the vicinity of stylus bar 50, and further serves to remove dust or paper particles which may be generated or freed by the rubbing contact between the styli and the paper. Of course, different aperture configurations, such as a plurality of shorter apertures of various shapes, are also foreseen, and may be advantageous under certain conditions.

Figure 4:
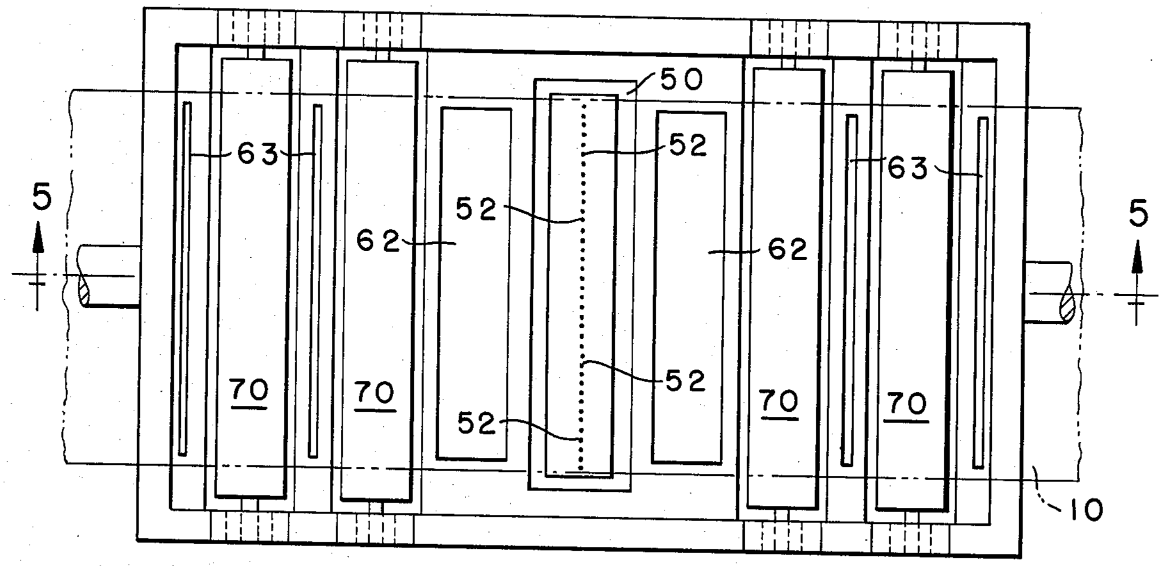
FIG. 4 is a schematic plan view showing one form of vacuum means and friction reducing means.
Figure 5:
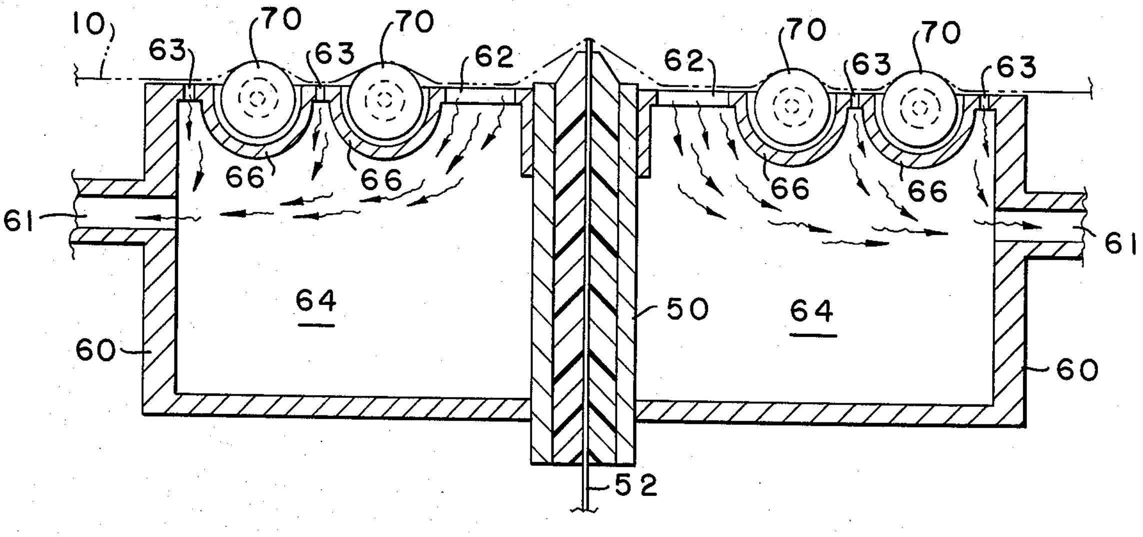
FIG. 5 is a schematic section view taken on line 5—5 of FIG. 4.
Figure 6:
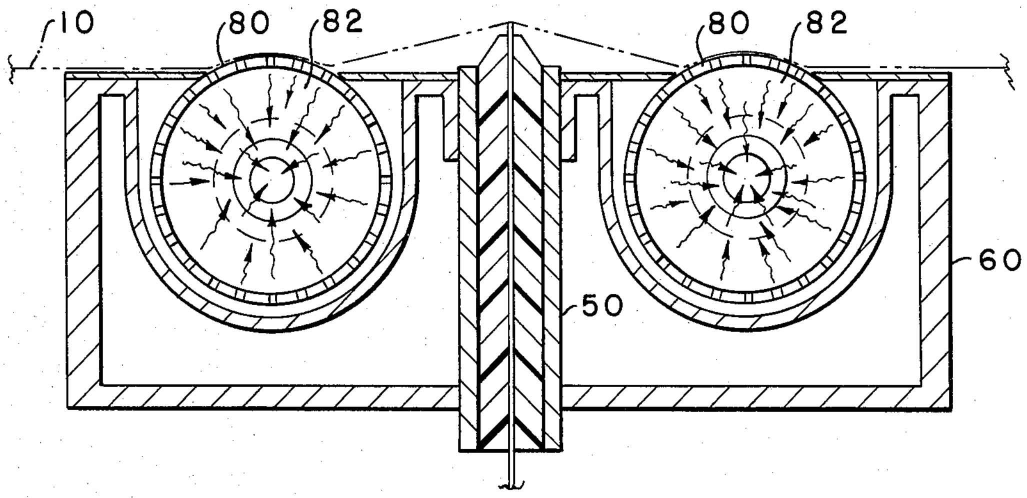
FIG. 6 is a schematic section view of another form of vacuum means and friction reducing means.
Figure 7:
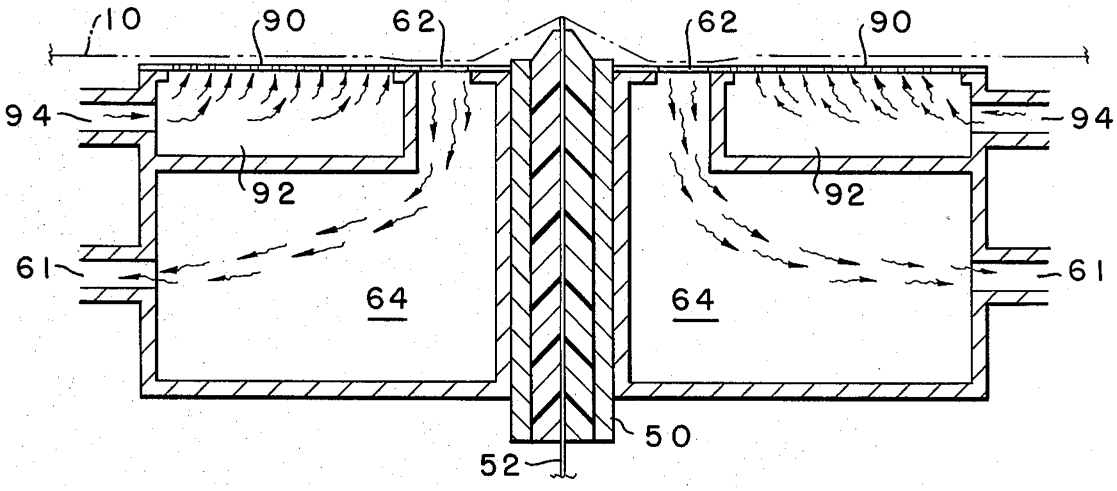
FIG. 7 is a schematic section view of yet another form of vacuum means and friction reducing means.

As can be appreciated, this use of vacuum slots often results in greatly increased frictional drag on the paper 10 as it passes over the stylus bar 50 and vacuum slots 62. As an aid in reducing friction, a low friction coating may be applied to the exterior surfaces of manifold lips 66 which contact the uncoated surface of paper 10. In cases where drag is still substantial, alternative friction-reducing arrangements for use in the vicinity of various vacuum apertures are schematically depicted in FIGS. 4, 5, and 6, and briefly described below. In FIGS. 4 and 5, the manifold lips 66 of FIG. 2 have been fitted with a series of small, low-friction rollers or roller bearings 70 to aid in supporting and transporting paper 10 in the vicinity of the stylus bar 50 with a minimum of drag. Placement of vacuum slots 62 and 63 immediately adjacent the stylus bar 50 and rollers 70, as shown, assures firm contact between paper 10 and the stylus tips. Use of two vacuum ports 61, each communicating with a source of vacuum, not shown, rather than a single port, increases efficiency. In FIG. 6, a single set of larger, hollow, foraminous rollers 80 are shown mounted adjacent to stylus bar 50. Rather than applying a partial vacuum via slots, a partial vacuum is induced in the hollow interior 82 of rollers 80, which attracts the paper 10 to the foraminous outside surface of the roller. Alternatively, the roller surface may be comprised of a porous material, such as sintered metal. The roller may be mounted in low friction bearings, or may be driven so as to assist in transporting the paper 10 across the stylus bar. In FIG. 7, the manifold lips 66 of FIG. 2 have been replaced with a foraminous plate 90 and small cavity 92. Ducts 94 supply air of a pressure sufficient to generate an air cushion between the exterior surface of plates 90 and moving paper 10; such air cushion effectively generates an extremely low friction "air bearing" which serves to support the paper in the vicinity of the vacuum slots 62 adjacent to the stylus bar 50.

Figure 8:
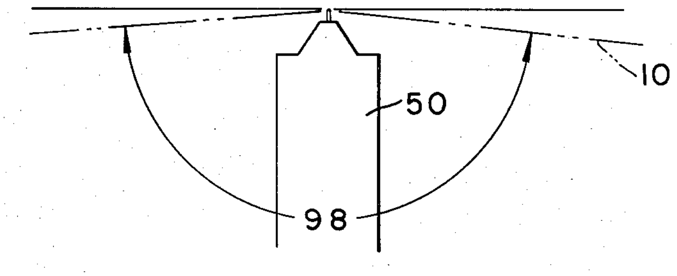
FIG. 8 is a schematic side view showing a stylus bar and substrate having a wrap angle less than 180°.

As an alternative to using vacuum means, the geometry of the paper relative to the stylus bar or other electric field generating means may be adjusted so that the angle subtended by the incoming and outgoing portions of the paper as the paper passes over the stylus bar, as measured from the unprinted side of the paper and as schematically depicted in FIG. 8, measures less than 180°. This angle 98 is termed the wrap angle as it suggests the angle at which the substrate is "wrapped" about the stylus bar or other electric field generating means. As can be seen from consideration of FIG. 8, by maintaining appropriate tension on the paper as the paper enters and leaves the stylus bar area and effectively pressing together the stylus bar 50 and the paper 10, a force is generated which tends to increase the contact pressure between the uncoated surface of paper 10 and the stylus tips, without requiring vacuum assistance. Preferred wrap angles range of from about 178° to about 174°. It is likely that smaller angles will be preferred for use with some pre-coated papers and certain alternative electric field generating means.

Each sltylus is individually connected to a source of electrical potential, not shown, which may be varied in response to computer generated commands. When no stylus has been energized, i.e., raised to an electrical potential higher than a given threshold voltage, ink in meniscus 40 contacts the barrier film 11 but does not wet the paper surface 10. However, energizing an individual stylus generates an electric field in the vicinity of the stylus tip which extends through the paper, and causes ink from the meniscus 40 to displace the barrier film 11 and wet the surface of paper 10 previously covered by the barrier film. In this way, an inked region surrounded by a background of barrier film is produced on the coated surface of paper 10.

This displacement of wetting action is extremely localized, and occurs only in that region on the coated surface of the paper directly opposite the stylus tip. When paper 10 is moving over stylus bar 50, applying a sustained voltage pulse above a requisite threshold value to an individual stylus will cause a line segment to be printed on the paper in the direction of paper travel for as long as that stylus remains energized. The printing of a dot is accomplished by energizing a stylus with a single, short voltage pulse of the requisite threshold value. The voltage required to cause a minute quantity of ink to displace the barrier film and wet the paper—the threshold voltage—will vary with the specific conditions, including the speed of the paper, but voltages from about 100 to about 600 volts are usually sufficient. To reduce the voltage levels that must be switched in the electronic circuitry, all styli are biased continuously at a voltage level below the threshold value. In order to cause a given stylus to print, it is then only necessary to supply a voltage pulse of sufficient magnitude to raise the total voltage on the stylus, i.e., bias level voltage plus pulse voltage, to some value in excess of the threshold value. For example, if the threshold voltage is 250 volts, biasing all styli to a level of 150 volts with respect to the ink meniscus will allow a voltage pulse of approximately 100 volts or more, applied to the individual styli of choice, to induce the printing of a dot or line segment. In an alternate arrangement, the ink meniscus itself is biased out with a polarity opposite that on the styli. It has further been found advantageous to use direct current of positive polarity as the source of biasing voltage; the positive charge tends to counteract negative triboelectric charges which can accumulate in the vicinity of the stylus array.

The width of the line formed and the amount of ink transferred depend upon the voltage level to which the stylus is raised above the threshold value, and the amount of time that the stylus is held at that voltage level, i.e., voltage pulse height and pulse length. For example, if the stylus is energized by a 400 volt pulse, the line segment printed will be wider than if the stylus is energized by a 200 volt pulse. By properly varying the voltage on the stylus, it is possible to print line segments which are wider, narrower, or of the same width as the stylus tip. By using voltage pulses of different duration, line segments of different lengths—including individual dots—may be printed. By adjustment of both pulse height (maximum voltage level) and pulse length (duration of voltage pulse), the actual quantity of ink per unit area within each printed dot or line segment may be varied. It is possible to print solid areas, halftones, or any other desired pattern. Further, it is possible to enhance the readability of alpha-numeric output by properly controlling the size, width, or relative contrast of each dot or line element within each character.

Following the application of ink to the paper surface and selective displacement of the barrier material by the ink, the printed paper surface may be air dried, or passed to a dryer 100 as shown in FIG. 1, where the liquid components of the ink and barrier material are evaporated, leaving paper 10 with a printed surface which is dry to the touch. Care must be taken prior to and during this drying stage that the boundaries defining the ink areas are kept intact, and that the inked areas are not allowed to distort or blend into non-inked areas. The printed paper is stored on take-up roll 102, as depicted in FIG. 1.

Addition of a second color to the imprinted surface of a suitably dry paper is accomplished by reapplication of a barrier material (which may be different from the barrier material applied in the first instance) to the dry, previously printed surface of the paper, followed by passage of the paper through a print station which is charged with ink of the desired color. Allowing the printed surface of the paper to dry results in the permanent addition of the second color to the previously printed image. The addition of further colors is accomplished by repeating the above process.

The following example will further serve to illustrate the invention.

EXAMPLE

Non-dielectric paper sold by Blandin Paper Company under the tradename "Rotoblade" and having a weight of approximately 15.5 kg. per ream was passed through an IR heater manufactured by the Fostoria Corp. of Ohio to lower the moisture content by weight. Residence time in the heater was approximately two seconds. The heater was spaced approximately 20 centimeters from the paper surface. Air temperature near the paper surface was within the range of from about 350° F. to about 420° F. The paper was then drawn over a roller which applied to one surface of the paper a thin coating of a hydrocarbon liquid barrier material, which in this example was Amsco mineral spirits 66/3, manufactured by the Union Chemicals Division of Union Oil Co., in a quantity equivalent to 6 to 7 grams per square meter of paper surface. The coated paper was then drawn between a stylus bar and an electrically grounded ink applicator roll with the coated side of the paper adjacent to the ink transfer roll. The paper-roll gap spacing was about 0.23 millimeter. The surface of the ink applicator roll was coated to a thickness of approximately 0.3 millimeter with a ceramic compound comprised of approximately 60% aluminum oxide and 40% titanium carbide. The speed of the paper was approximately 15 centimeters per second and the amount of ink fed to the meniscus by the ink applicator roll was approximately 20 milliliters per minute. The stylus bar used a single row of stainless steel styli of about 0.125 millimeter in diameter and having a spacing of approximately 4 styli per millimeter, each surrounded by a non-conductive epoxy resin, with the tip of each stylus approximately 0.2 millimeter from the surface of the resin. Each stylus was biased to a potential of 100 volts relative to ground, with no image resulting, and was then energized to about 400 volts relative to ground in accordance with pattern information supplied by a digital computer. The paper was "wrapped" about the styli at a wrap angle of approximately 176°. The ink contained approximately 12% of a red dye sold by Ciba Geigy as Teraprint Red 3G, about 69.5% distilled water, about 18% binder principally comprising a copolymer of methyl methacrylate and ethyl acrylate (Rohm and Haas Rhoplex Ha16), about 0.5% of a nonionic wetting agent (Leveler 2406 sold by Milliken Chemical Co.), and a small amount of a defoaming agent (Nopco 267F). The paper was passed through a dryer. A sharp, well defined image was obtained.

While the methods and apparatus herein described in the specification and accompanying drawings illustrate preferred embodiments of the invention, it is to be understood that the invention is not limited to these methods and apparatus, and that changes may be made without departing from the scope of the invention defined in the appended claims.

I claim:

1. A method for printing on a substrate surface comprising the steps of:
(a) providing a dry substrate;
(b) applying a barrier material to coat one surface of said substrate;
(c) locating a marking material applicator means in operative relationship with said coating surface of said substrate;
(d) applying a marking material immiscible with said barrier material to said coated surface of said substrate;
(e) locating an electric field generating means in operative relation with a second surface of said substrate opposite said applicator means;
(f) locating a vacuum holding means adjacent to said field generating means and in operative relation with said second substrate surface;
(g) engaging said vacuum holding means to draw said second substrate surface toward said electric field generating means while moving said coated surface of said substrate into operative relation with said applicator means and simultaneously generating an electric field substantially opposite said applicator means, thereby causing said marking material to displace selectively said barrier material and to wet said coated surface of said substrate.

2. The method recited in claim 1 further comprising locating a friction-reducing means in the vicinity of said vacuum holding means to reduce frictional drag on said substrate.

3. A non-impact printer for printing on a substrate surface comprising:
(a) drying means for removing moisture from the substrate to be imprinted;
(b) first applicator means for applying a coating of barrier material to one surface of said substrate;
(c) second applicator means for applying a marking material immiscible with said barrier material to said surface of said substrate;
(d) electric field generating means mounted in a position substantially opposite said second applicator means, thereby defining a gap therebetween through which said substrate may pass;
(e) vacuum means operatively positioned adjacent to said electric field generating means, to promote contact between said field generating means and said substrate;
(f) means to selectively energize said electric field generating means as said substrate passes through said gap, causing said marking material to displace said barrier material and to wet said surface of said substrate; and
(g) means to bring said substrate into operative relationship with said drying means, said first applicator means, said second applicator means, and said electric field generating means.

4. The printer of claim 3 wherein said electric field generating means comprises a stylus bar means, and wherein said vacuum means is in the form of slot means parallel to said stylus bar means.

5. The apparatus of claim 3 which further comprises friction-reducing means to reduce frictional drag on said substrate in the vicinity of said vacuum means.

6. The printer of claim 5 wherein said friction-reducing means is in the form of roller means.

7. The printer of claim 6 wherein said roller means are hollow and contain a partial vacuum.

8. The printer of claim 5 where said friction-reducing means is in the form of air cushion means.

9. A non-impact printer for printing on a substrate surface comprising:
(a) drying means for removing moisture from the substrate to be imprinted;
(b) first applicator means for applying a coating of barrier material to one surface of said substrate;
(c) second applicator means comprising an applicator roll for applying a marking material immiscible with said barrier material to said surface of said substrate, said applicator roll having associated therewith doctoring means and vacuum means to remove material from the surface of said applicator roll;
(d) electric field generating means mounted in a position substantially opposite said second applicator means, thereby defining a gap therebetween through which said substrate may pass;
(e) means to energize selectively said electric field generating means as said substrate passes through said gap, causing said marking material to displace said barrier material and to wet said surface of said substrate; and
(f) means to bring said substrate into operative relationship with said drying means, said first applicator means, said second applicator means, and said electric field generating means.

* * * * *